United States Patent
Spiegl et al.

(10) Patent No.: US 8,281,805 B2
(45) Date of Patent: Oct. 9, 2012

(54) AUTOMATIC SUCTION AND PRESSURE VALVE

(75) Inventors: Bernhard Spiegl, Vienna (AT); Markus Testori, Hollabrunn (AT); Peter Steinrück, Hallstatt (AT)

(73) Assignee: Hoerbiger Kompressortechnik Holding GmbH, Wien (AT)

( * ) Notice: Subject to any disclaimer, the term of this patent is extended or adjusted under 35 U.S.C. 154(b) by 480 days.

(21) Appl. No.: 12/076,526

(22) Filed: Mar. 19, 2008

(65) Prior Publication Data

US 2008/0230733 A1    Sep. 25, 2008

(30) Foreign Application Priority Data

Mar. 22, 2007  (AT) .................................. A 454/2007

(51) Int. Cl.
*F16K 15/00*    (2006.01)
(52) U.S. Cl. ............... 137/516.11; 137/512.15; 251/337
(58) Field of Classification Search ............... 137/454.4, 137/536, 512.15, 512.5, 516.11–516.23; 267/178, 179; 251/337
See application file for complete search history.

(56) References Cited

U.S. PATENT DOCUMENTS

| 1,593,914 A | | 7/1926 | Redfield |
| 1,669,361 A | * | 5/1928 | Tuttle ........................ 137/512.15 |
| 1,958,219 A | * | 5/1934 | Voss ........................... 137/454.4 |
| 2,035,776 A | * | 5/1934 | Voss ........................... 137/454.4 |
| 2,687,269 A | | 8/1954 | Titus et al. |
| 3,320,900 A | * | 5/1967 | Johnson ........................ 417/238 |
| 3,536,094 A | | 10/1970 | Manley |
| 2002/0144733 A1 | | 10/2002 | Artner |

FOREIGN PATENT DOCUMENTS

| CH | 446237 | 3/1968 |
| DE | 672163 | 2/1939 |
| EP | 0572748 | 12/1993 |
| FR | 383914 | 4/1908 |
| GB | 406132 | 2/1934 |
| GB | 532178 | 1/1941 |

OTHER PUBLICATIONS

English Abstract of EP 0572748, Dec. 8, 1993.

* cited by examiner

*Primary Examiner* — Kevin Lee
*Assistant Examiner* — Macade Brown
(74) *Attorney, Agent, or Firm* — Dykema Gossett PLLC

(57) ABSTRACT

A spring cup in an automatic suction and pressure valve has an internal contour which opens in the shape of a calotte so as to reduce wear at the ends of a valve spring positioned in the spring cup and thereby lengthen its useful life.

7 Claims, 2 Drawing Sheets

AUTOMATIC SUCTION AND PRESSURE VALVE

BACKGROUND OF THE INVENTION

1. Field of the Invention

The present invention relates to an automatic suction and pressure valve having a valve seat, a valve stop and a sealing element that can move to and fro between the valve seat and the valve stop, and wherein at least one valve spring is arranged in a spring cup in the valve stop so as to load the sealing element against the valve seat.

2. The Prior Art

In suction and pressure valves, such as compressor valves, the sealing element is often loaded against the valve seat by valve springs, normally spiral springs, arranged in the valve stop. Such suction and pressure valves are known, for example from U.S. Pat. No. 1,593,914 A, which shows conical blind drilled holes to accommodate the spiral springs in the valve stop, and from EP 572 748 A1, which shows a cylindrical centering section at the bottom of a cylindrical blind drilled hole to accommodate the spiral springs. U.S. Pat. No. 3,536,094 A shows such a suction and pressure valve having individual rings as sealing elements.

In particular, the manufacture of spiral springs with a completely straight alignment and a ground section aligned completely normal to the axial direction of the spring is difficult, however. The majority of spiral springs have a slight angular deviation within predefined limits. Therefore, the compression of a spiral spring leads to a small force component normal to the deformation direction and, as a result, the angular deviation is further promoted. Angled spiral springs and/or force components normal to the axial direction of the spiral spring assist the rotation of the sealing element, for example of a valve plate or a number of valve rings in ring valves. In addition, a non-uniform inlet flow around the sealing element in valves generally leads to the non-parallel movement of the sealing element and, in the case of ring valves, to ring rotation. During the operation of the suction and pressure valve, all this leads to a deflection of the valve spring out of the axial direction. In particular in the case of ring valves, the ring rotation can cause severe deflection of the valve springs normal to the axial direction.

As a result of a deflection of the valve spring normal to the axial direction, contact occurs between the valve spring, which is usually fabricated from steel, and the (metallic) valve stop. The contact with the (metallic) valve stop leads to wear and damage to the spring and also to the valve stop itself and, as a result, to a reduced lifetime of valve spring and/or valve stop. For this reason, years ago spring cups began to be arranged in the valve stop in suction and pressure valves, in particular compressor valves, the valve springs being inserted and guided in said spring cups in order to avoid spring wear and wear on the valve stop.

Spring cups are also used in ring valves in order, for the purpose of adequate support and guidance of the springs even in the case of restricted installation conditions, to be able to use springs with a diameter which corresponds substantially to the width of a ring, as can be gathered for example from EP 1 247 982 A2.

However, it has been observed that, despite the use of spring cups, it is possible for wear problems with the springs to occur. The reason for this is that, in the case of highly impact-stressed valve springs, the first and last spring turns are stressed up to twice as highly as the spring turns in the central region, because of the reflection of the shock waves. In the event of more intense rotation of the sealing element or more intense deflection of the spring, however, in the case of conventional spring cups the spring touches the edge of the spring cup with the spring end which is most highly loaded. In this case, either damage occurs to the spring cup or, even more critically, wear occurs on the critical turns of the spring or a spring fracture occurs, caused by the hindrance to movement of the spring.

It is therefore an object of the present invention to eliminate the abovementioned disadvantages of conventional spring cups and, in particular, to reduce wear at the spring ends of the valve spring arranged in the spring cup to the greatest possible extent, in order to increase the lifetime in particular of the valve springs.

SUMMARY OF THE INVENTION

According to the invention, this object is achieved in that the internal contour of the spring cup is designed in the shape of a calotte opening from the spring cup base. The calotte-shaped internal contour means that, in the case of an angular deviation or deflection of the spring normal to the axial direction, the spring can in no case come into contact with the edges of the spring cup at the spring ends. Instead, the spring cup makes contact only with the less loaded central spring turns of the valve spring. In addition, on account of the gentler and greater contact area of the valve spring with the spring cup, it is possible to use softer spring cup materials with a greater tolerance to damage or tribologically optimized materials, for example based on PTFE.

As trials have shown, the embodiment according to the invention provides a significantly longer potential lifetime even under extreme conditions, for example even with corrosive particles in gas, since the wear occurs only in non-critical spring regions.

The internal contour in the region of the spring cup base advantageously has a smaller curvature than in the region of the spring cup opening, which means that the contact area of the valve spring with the spring cup can be increased further.

The valve spring can be centered and held very simply in the spring cup if, in the region of the spring cup base, an internal contour section is provided which is designed with the same contour as the external contour of the envelope of the valve spring.

In order to avoid contact of the valve spring with the spring cup in the case of no deflection or only slight deflection, it may advantageously be provided for the internal contour of the calotte-shaped section to be designed larger than the external contour of the envelopes of the valve spring.

In this case, a transition is advantageously provided between the internal contour section and calotte-shaped section.

The spring cup for a spiral spring as a valve spring can be fabricated particularly simply, since the internal contour is then rotationally symmetrical and the internal contour section is cylindrical.

The present invention will be described below by using the schematic, non-restrictive FIGS. 1 to 3, which show preferred refinements. Here:

DETAILED DESCRIPTION OF THE PREFERRED EMBODIMENT

Figure 1:
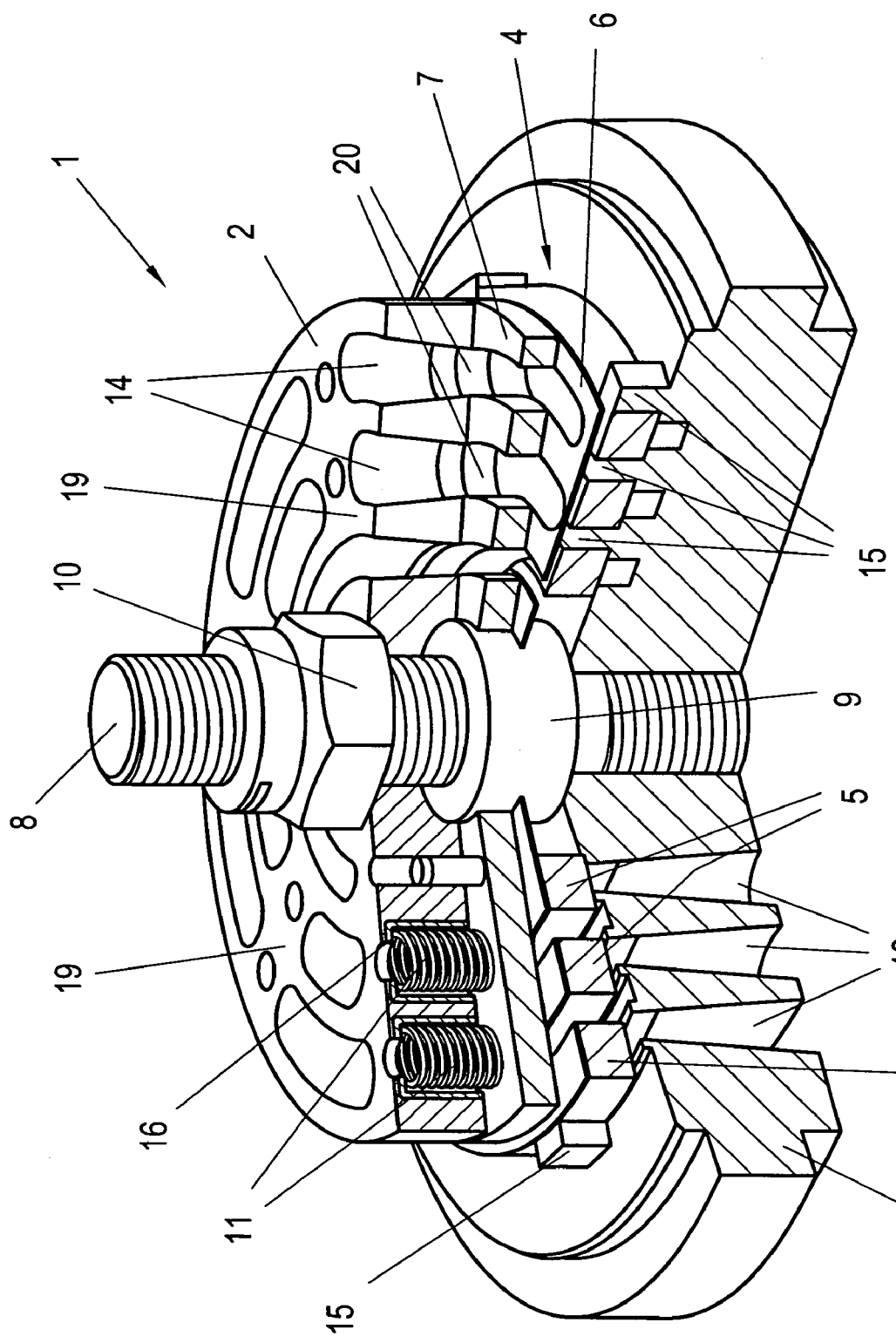
FIGS. 1 and 2 each show a section through a suction and pressure valve according to the invention and FIG. 3 shows an enlarged illustration of a spring cup with a valve spring.
Figure 2:
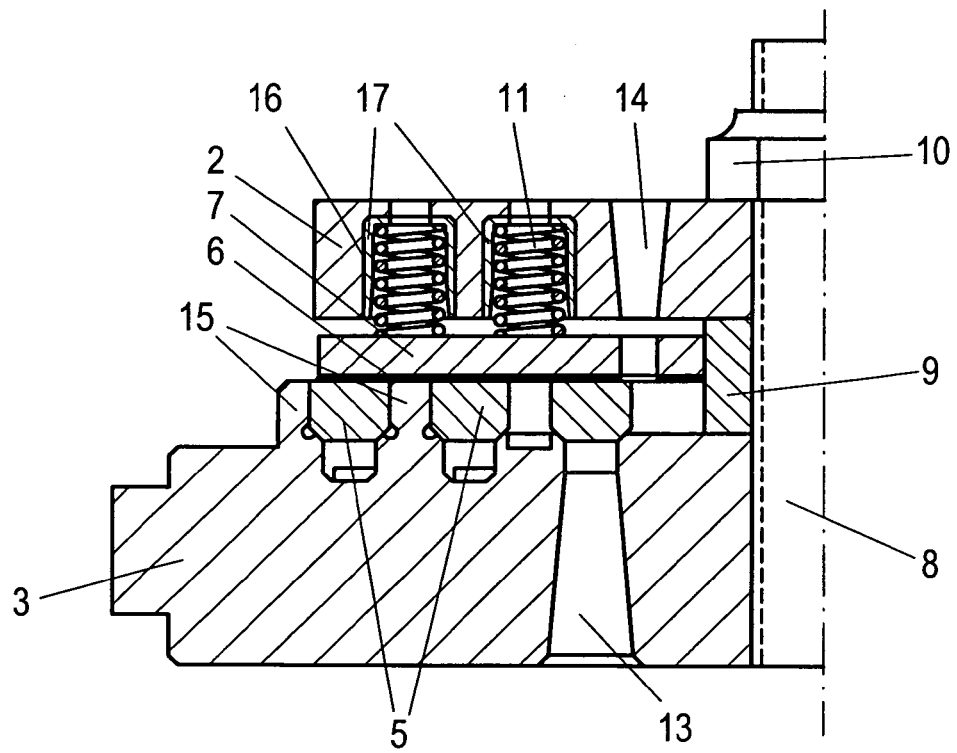

The basic structure of a suction and pressure valve 1 is sufficiently well known, for which reason it will be discussed here only briefly with reference to FIGS. 1 and 2 using a ring valve illustrated therein. A ring valve 1, for example for use in compressors, comprises a valve seat 3 and a valve stop 2. Arranged between these is a sealing element 4, which is moved to and fro between valve seat 3 and valve stop 2 and, in interaction with the valve seat 3, performs the sealing function by closing and exposing the flow cross section through the ring valve 1. The individual parts of the ring valve 1 are held together by a through bolt 8 and a nut 10. The distance between valve seat 3 and valve stop 2, and thus the possible valve stroke, is adjusted by a spacer washer 9 or an axial projection on the valve stop 2 or on the valve seat 3. Annular through passages 13 are arranged in the valve seat 3 and annular outlet passages 14 are arranged in the valve stop 2. The annular passages 13, 14, as is known, are actually sections of a circular ring which are interrupted by radial lands 19.

Here, the sealing element 4 comprises concentrically arranged sealing rings 5 which interact with the valve seat 3. For this purpose, in each case associated and interacting sealing surfaces are arranged on the sealing rings 5 and on the valve seat 3.

Arranged on the valve seat 3, distributed over the circumference at different radial intervals, are a number of annular guide studs 15 projecting axially from the valve seat 3 in the direction of the sealing rings 5, between which the individual sealing rings 5 are arranged so as to be guided both in the radial and in the axial direction. In this case, the annular guide studs 15 project axially out of the valve seat 3 at least to such an extent that the sealing rings 5 remain guided during the entire ring opening movement.

In this case, an annular guide stud 15 is arranged in the radial direction between two sealing surfaces of the valve seat 3.

The sealing element 4 can further comprise a synchronizing plate 7, which is arranged on the sides of the sealing rings 5 opposite the valve seat 3, and a separating plate 6 located between synchronizing plate 7 and sealing rings 5. The synchronizing plate 7 is spring-loaded by a row of valve springs 11, spiral springs here, arranged in spring pockets 16 on the valve stop 2, the valve springs 11 being arranged in spring cups 17. In this case, the spring cups 17 are advantageously arranged in the radial lands 19 of the valve stop 2. The valve springs 11 thus press the sealing element 4, here the sealing rings 5, against the valve seat 3 via the synchronizing plate 7 and the separating plate 6. During the ring opening movement, the sealing rings 5 are lifted off the valve seat 3 by the rising gas pressure, counter to the force of the spiral springs 11. The synchronizing plate 7, the separating plate 6 and the sealing rings 5 here form the sealing element 4 of the ring valve 1.

Of course, the sealing element 4 can likewise comprise only sealing rings 5 or a sealing plate. In this case, the valve springs 11 can also act directly on the sealing rings 5 or the sealing plate.

In the synchronizing plate 7 and the separating plate 6 there is of course once more arranged a row of preferably annular passage openings 20 (actually a row of circular ring sections that are separated by radial lands), in order that the gaseous medium can pass through the ring valve 1 as far as possible without loss.

Figure 3A:
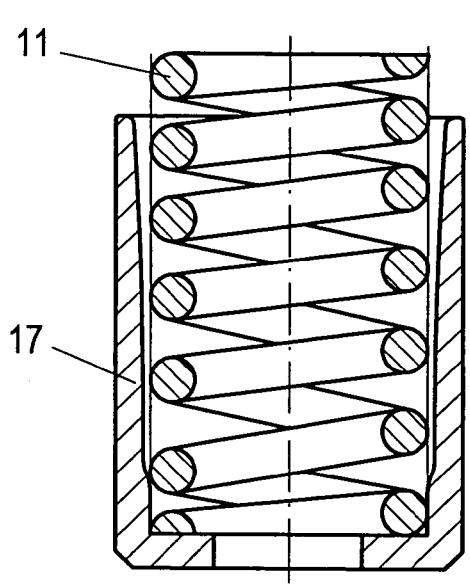
Figure 3B:
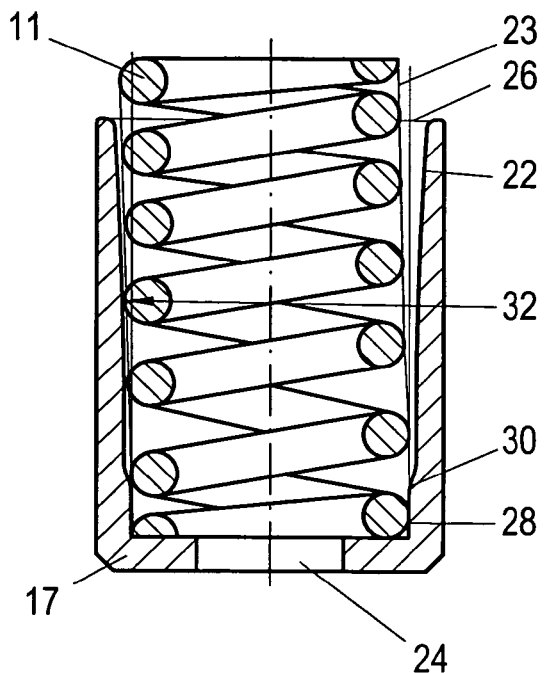

Here, as illustrated in FIGS. 3a and 3b, the spring cup 17 has a cylindrical external contour and thus fits into a cylindrical blind drilled hole as a spring pocket 16. Of course, the external contour can also have any other suitable shape. The shape of the internal contour 22 is critical for the present invention.

In this case, the internal contour 22 of the spring cup 17 opens in the shape of a calotte from the region of the spring cup base 24. The internal contour 22 thus follows a curve which, in the region of the spring cup base 24, has a small curvature (is therefore very flat) and the curvature increases toward the spring cup opening 26. In this case, the internal contour 22 is curved outward. In the region of the spring cup opening 26, a rounded portion can also be provided on the outside for a clean transition to the end face of the spring cup 17. As a result of the outward curvature, the internal contour 22 of the spring cup 17 is larger than the external contour 23 of the envelope of the valve spring 11. Thus, within certain limits the valve spring 11 can also move normally with respect to the axial direction of the spring cup 17.

For a spiral spring as valve spring 11, the internal contour is naturally rotationally symmetrical about the axial direction of the spring cup 17, and the internal diameter of the spring cup 17 increases from the spring cup base 24 to the spring cup opening 26.

In the region of the spring cup base 24 it is possible to provide an internal contour section 28, as illustrated in FIGS. 3a and 3b, the contour of which corresponds to the external contour 23 of the envelope of the valve spring 11. Likewise, an easy press fit can be provided in this region. For a spiral spring as valve spring 11, illustrated in FIGS. 3a and 3b, this internal contour section 28 would of course be cylindrical. In this case, a transition 30 from this internal contour section 28 to the calotte-shaped internal contour 22 of the spring cup 17, which is larger than the external contour 23 of the envelope of the valve spring 11, can also be provided. The valve spring 11 can be pushed into this internal contour section 28 during mounting and centered and held in the region of the spring cup base 24. However, the calotte-shaped internal contour 22 can also open from the very bottom of the spring cup base 24.

FIG. 3a shows the valve spring 11, here a spiral spring, in the non-deflected state. In this position, the valve spring is spaced apart on all sides from the spring cup 17. If the valve spring 11 is then deflected normally with respect to the axial direction or if the valve spring 11 stands at an angle, then the valve spring 11 makes contact with the spring cup 17 only in the central region 32 of the valve spring 11, because of the calotte-shaped internal contour 22, and not with the edges of the spring cup 17 at the valve spring ends, as illustrated in FIG. 3b. This avoids the situation in which the highly loaded valve spring ends touch the spring cup 17.

The calotte-shaped curve of the internal contour 22 could of course also equally be approximated by a polygon curve.

The invention claimed is:

1. An automatic suction and pressure valve having a valve seat, a valve stop and a sealing element that can move to and fro between said valve seat and said valve stop, a spring cup in the valve stop which has a base and an opposite opening, and a valve spring in the spring cup for loading the sealing element against the valve seat, said valve spring defining an envelope having an external contour, wherein an internal contour of the spring cup includes a first section which extends to said opening and is curved in the shape of a calotte such that the curvature of the internal contour of said first section continuously increases from a smaller curvature to a larger curvature at said opening, and a second section at the base which has the same contour as the external contour of the envelope of the valve spring.

2. The automatic suction and pressure valve as claimed in claim 1, wherein the first section of the internal contour extends from the spring cup base to the spring cup opening.

3. The automatic suction and pressure valve as claimed in claim 1, wherein the internal contour of the first section is larger than the external contour of the envelope of the valve spring.

4. The automatic suction and pressure valve as claimed in claim 1, wherein a transition is provided from the second section to the first section.

5. The automatic suction and pressure valve as claimed in claim 1, wherein the valve spring is a spiral spring and the internal contour is rotationally symmetrical.

6. The automatic suction and pressure valve as claimed in claim 1, wherein the second section is cylindrical.

7. The automatic suction and pressure valve as claimed in claim 5, wherein an internal diameter of the first section is larger than an external diameter of the spiral spring.

* * * * *